United States Patent [19]

Tamura et al.

[11] Patent Number: 4,927,358

[45] Date of Patent: May 22, 1990

[54] APPARATUS FOR PRODUCING HONEYCOMB PANELS

[75] Inventors: Mitsunobu Tamura, Chigasaki; Toshifumi Tsuchihashi, Tokyo; Toshihisa Kenmochi, Wako, all of Japan

[73] Assignees: The Yokohama Rubber Co., Ltd.; Honda Giken Kogyo Kabushiki Kaisha, both of Tokyo, Japan

[21] Appl. No.: 343,642

[22] Filed: Apr. 27, 1989

[30] Foreign Application Priority Data

May 6, 1988 [JP] Japan .................................. 63-108949

[51] Int. Cl.$^5$ .......................... F26B 3/04; B32B 31/20; C09J 5/06
[52] U.S. Cl. .................................... 432/204; 156/285; 156/286; 264/510; 432/162; 432/199; 432/144
[58] Field of Search ............... 432/144, 152, 162, 163, 432/199, 204, 208, 250, 253; 156/285, 286, 288, 382, 497; 219/78.12; 34/204

[56] References Cited

U.S. PATENT DOCUMENTS

| | | |
|---|---|---|
| 2,050,254 | 1/1934 | Barnsteiner ..................... 432/204 X |
| 3,738,890 | 4/1971 | Johnson et al. ..................... 156/286 |
| 4,201,903 | 5/1980 | Becker ............................. 219/78.12 |
| 4,312,829 | 1/1982 | Fourcher ......................... 264/510 X |
| 4,322,204 | 3/1982 | Voegtlin et al. ..................... 432/152 |
| 4,596,624 | 6/1986 | Frohlich et al. ................ 156/285 X |
| 4,689,105 | 8/1987 | Fazlin et al. ......................... 156/382 |
| 4,816,106 | 3/1989 | Turris et al. ..................... 264/510 X |

Primary Examiner—Henry A. Bennet
Assistant Examiner—Christopher B. Kilner
Attorney, Agent, or Firm—Armstrong, Nikaido, Marmelstein, Kubovcik & Murray

[57] ABSTRACT

Apparatus for producing honeycomb panel comprising a heating chamber isolated by a wall from outer air and a plurality of drawout trays capable of being individually inserted into and withdrawn from the heating chamber through a plurality of openings formed in the wall. Each of these drawout trays has a work accommodating chamber connected to a vacuum source, a top opening of which can be hermetically closed by a flexible sheet that can be opened and closed. Also each of the drawout trays has block plates at the front and rear ends for closing the opening in the wall at every terminal positions when inserted and withdrawn.

7 Claims, 4 Drawing Sheets

APPARATUS FOR PRODUCING HONEYCOMB PANELS

BACKGROUND OF THE INVENTION

This invention relates to apparatus for producing honeycomb panels, and more particularly, to apparatus which enables continuous production of honeycomb panels and thereby improves productivity.

The honeycomb panel, as shown in FIG. 6, is a panel material which consists of a honeycomb core C formed of light metal foil or paper, sandwiched between two thin plates B of steel, light metal or plastics bonded together. The honeycomb panel used as a structural material is known for its light weight and very high resistance against bending. Such honeycomb panels have been manufactured, as shown in FIG. 7A, by placing on a table 71 a work W consisting of a honeycomb core C sandwitched between two thin plates B, B with thermosetting bonding agent applied therebetween; surrounding the work W with a plurality of frame members 74 and wrapping the entire assembly in a vacuum bag 72; putting the wrapped assembly in an autoclave 75, as shown in FIG. 7B; evacuating the interior of the vacuum bag 72 to apply atmospheric pressure on the work W and bind the honeycomb core C and the thin plates B together; and, in this condition, heating the interior of the autoclave 75 to harden the thermosetting adhesive between the honeycomb core C and the thin plates B.

This method, however, processes the honeycomb panels by a batch system, in which the autoclave is stopped to be heated every batch to replace processed works with new unprocessed ones. Therefore, at a time of starting next batch, it takes a fairly long time for the autoclave to raise a temperature to a necessary level for processing the works. This time loss lowers significantly the productivity and raise costs for production. Also, since the autoclave is very expensive, costs for an equipment are high.

SUMMARY OF THE INVENTION

An object of this invention is to provide apparatus for producing honeycomb panels which allows continuous processing of the honeycomb panels instead of the conventional batch processing.

Another object of this invention is to provide apparatus for producing honeycomb panels which improves productivity by employing a continuous processing.

A further object of this invention is to provide apparatus for producing honeycomb panels which needs not an expensive equipment such as an autoclave to reduce costs for building and running the equipment.

According to this invention, the above objects can be achieved by an apparatus which comprises a heating chamber isolated by a wall from external air, and a plurality of drawout trays capable of being individually inserted into and withdrawn from the heating chamber through a plurality of openings formed in the wall. Each of the drawout trays has a work accommodating chamber connected to a vacuum source, a top opening of which can be hermetically closed by a flexible sheet that can be opened and closed. Also each drawout tray has block plates at the front and rear ends thereof for closing the opening in the wall at every terminal positions when the drawout tray is inserted into and withdrawn from the heating chamber.

In the above apparatus, a plurality of drawout trays can independently be inserted into and withdrawn from the heating chamber while the heating chamber keeps to be substantially isolated from external air. Thus, it is possible without stopping a heating operation of the heating chamber to withdraw the drawout trays from the heating chamber to replace the heat-treated work in the tray with an unprocessed work and insert the loaded trays into the heating chamber for heating, these steps being carried out continuously. Therefore, a continuous production of honeycomb panels is possible without stopping the heating operation of the heating chamber.

DETAILED DESCRIPTION OF THE PREFERRED EMBODIMENTS

Figure 1:
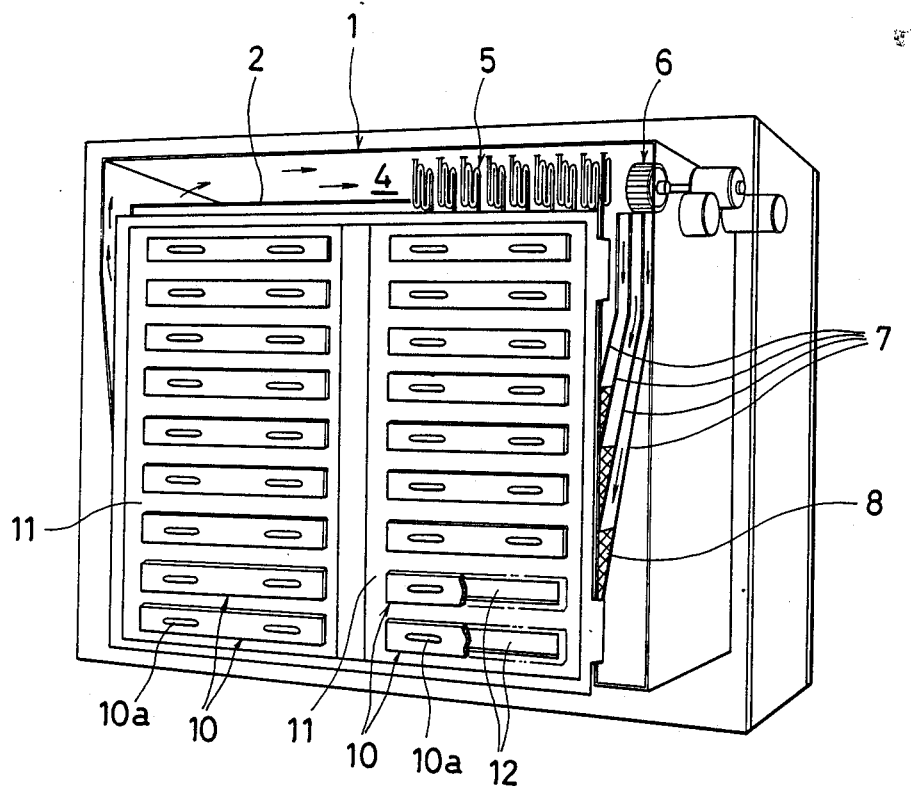
FIG. 1 is a perspective view of an apparatus for producing honeycomb panels as one embodiment of this invention, with a part of the outer wall removed.
Figure 2:
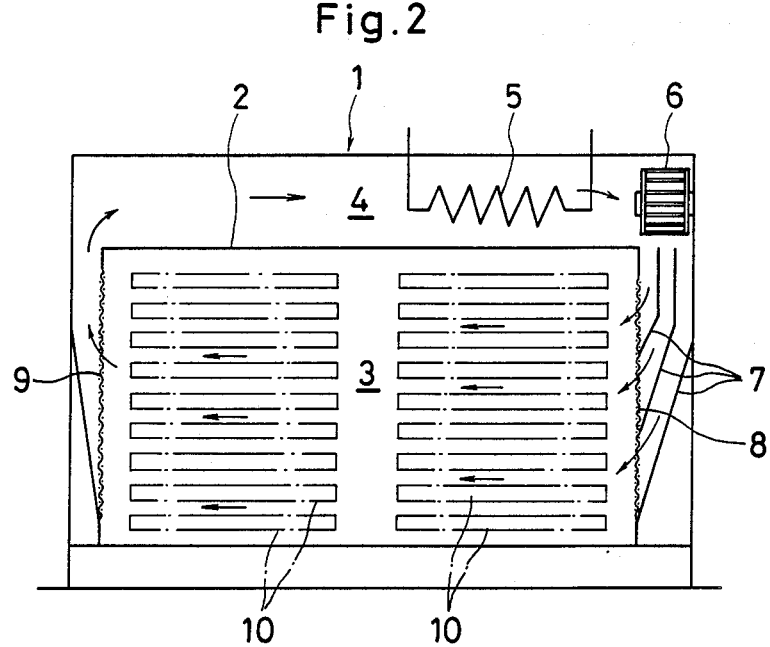
FIG. 2 is an schematic view of the apparatus for producing honeycomb panels of FIG. 1.

Referring to FIG. 1 and FIG. 2, reference numeral 1 represents a frame formed like a box, in which a partition plate 2 is installed to form a heating chamber 3 and a circulation passage 4, the former being arranged beneath the latter. In the circulation passage 4, a heater 5 and a circulation fan 6 are provided. The fan 6 forcibly circulates the air heated by the heater 5 through the circulation passage 4 into the heating chamber 3. In this embodiment, a Silocco fan is used as the circulation fan 6 to feed a large volume of heated air through a plurality of distribution plates 7 to form laminar flows entering uniformly into the heating chamber 3. Filters 8, 9 are provided at the inlet and outlet of the heating chamber 3 to remove dust in the heated air.

In this embodiment, the heating chamber 3 is heated by blowing the hot air heated by the heater 5 provided outside the heating chamber 3 through the circulation passage 4 into the heating chamber 3. The heating chamber 3 may be heated by other systems. For example, instead of providing the heater or circulation passage outside the heating chamber, the heater may be installed inside the heating chamber to heat directly the air inside. In this direct heating system, it is desirable to provide an agitator inside the heating chamber to agitate or circulate the air.

In the heating chamber 3, a plurality of drawout trays 10 are provided to be spaced from one another and arranged so as to cross a direction of the hot air flow. Each of the drawout trays 10 has grips 10a, by which it can be taken out of and into the heating chamber 3. The plurality of drawout trays 10 are preferably arranged in multiple rows and tiers for effective utilization of the space and for better handling. In this embodiment a total of 18 trays are arranged in two rows and in nine tiers. The drawout trays 10 can individually be inserted into and withdrawn from the heating chamber 3 by passing their bodies through openings 12 formed in a wall 11 separating the heating chamber 3 from the external air.

Figure 3:
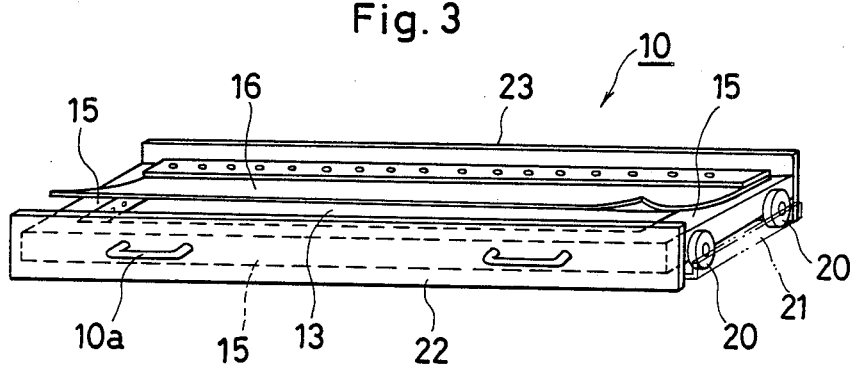
FIG. 3 is a perspective view of a drawout tray installed in the apparatus for producing honeycomb panels of FIG. 1.
Figure 4:
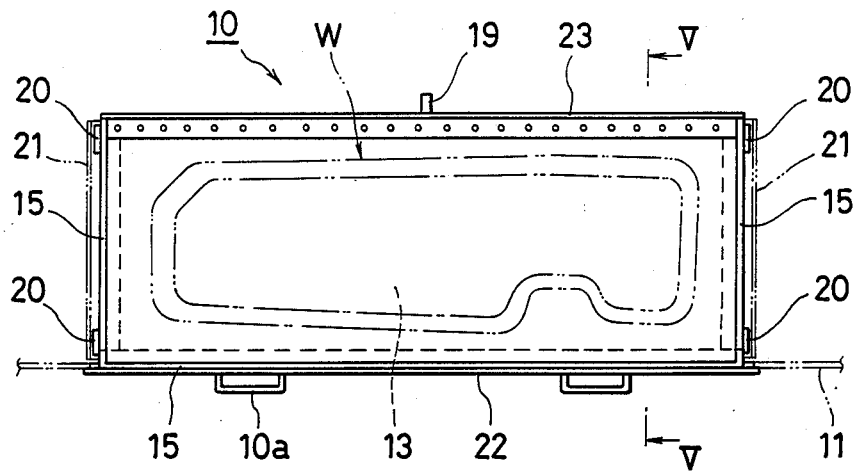
FIG. 4 is a plan view of the drawout tray of FIG. 3.
Figure 5:
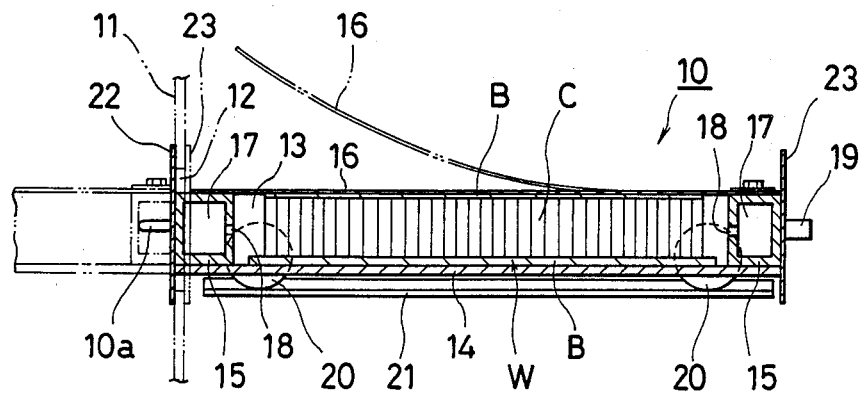
FIG. 5 is a cross-sectional view taken along the line V—V of FIG. 4.

FIGS. 3, 4 and 5 show details of one of the drawout trays 10. The drawout tray 10 has a work accommodating chamber 13 in its body portion which is formed by a bottom plate 14 and hollow frame members 15 secured to the four sides of the bottom plate 14. The work accommodating chamber 13 can be hermetically closed on its top opening by a flexible sheet 16 which can be opened and closed, one side of which is secured to the frame member 15 on the rear side. The flexible sheet 16 is preferably formed of a heat resistant plastic material as which, in this embodiment, a silicone rubber is used. Each of the frame members 15 surrounding the work accommodating chamber 13 forms an exhaust passage 17 therein. A large number of exhaust holes 18 are formed in the inner wall of the frame member 15 and communicate with the exhaust passage 17. The exhaust passage 17 of the frame member 15 on the rear side communicates with a vacuum equipment not shown through a valve 19. Thus, when the vacuum equipment is operated, three sides of the flexible sheet 16 adhere to the upper surfaces of the frame members 15, to generate a vacuum in the work accommodating chamber 13.

The drawout tray 10 has block plates 22, 23 secured to the front and rear ends, respectively, which are like a flange to extend vertically beyond the top and bottom of the work accommodating chamber 13. The block plate 22 at the front end also extends widthwise from both sides of the work accommodating chamber 13, like a flange. Of these two block plates 22, 23, the front block plate 22 closes the opening 12 in the wall 11 when the drawout tray 10 is inserted into the heating chamber 3 to the most inner position. The rear block plate 23 closes the opening 12 in the wall 11 when the tray 10 is withdrawn from the heating chamber 3 to the most outer position.

The drawout tray 10 has a pair of rollers 20, 20 on each of both sides which are engaged with guide rails 21 secured to a frame of the heating chamber 3. Hence, the drawout tray 10 can be moved to and fro along the guide rails 21. Although, in this embodiment, the rollers 20 are attached to the tray 10 and the guide rails 21 are mounted on the frame, it may reverse the arrangement so that the rollers 20 are attached to the frame and the guide rails 21 are mounted on the tray 10.

Figure 6:
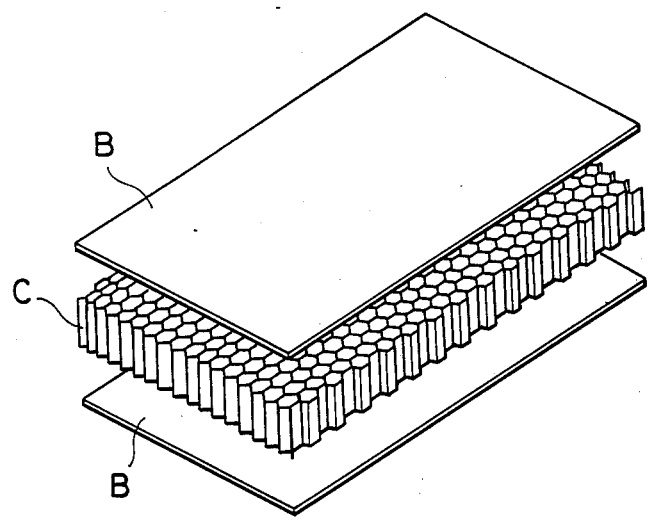
FIG. 6 is a perspective view of a honeycomb panel shown in a condition of a honeycomb core and two thin plates separated one another.
Figure 7A:
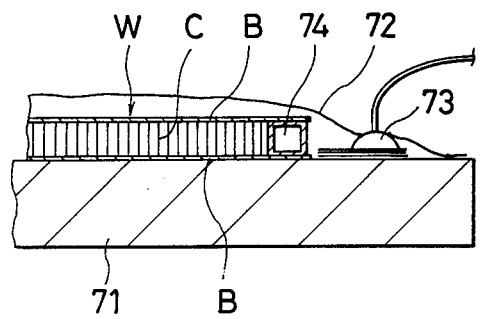
FIG. 7A is an explanatory view showing an example of a conventional apparatus for producing honeycomb panels.
Figure 7B:
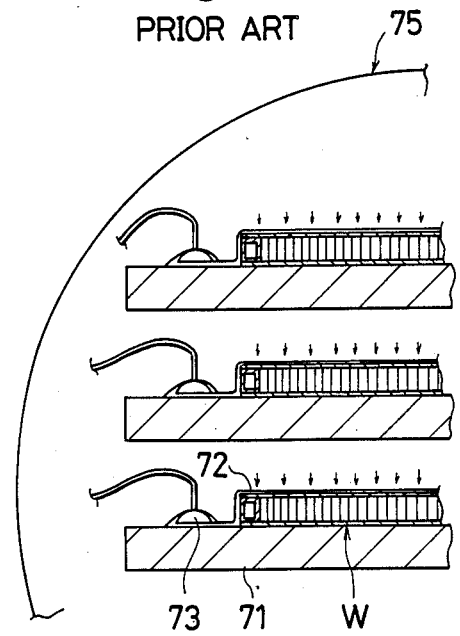
FIG. 7B is an explanatory view showing the conventional apparatus of FIG. 7A inserted in an autoclave.

A work W contained in the work accommodating chamber 13 of the drawout tray 10 for heat treatment consists, as shown in FIG. 6, of a honeycomb core C and two thin plates B, B made of steel, light metal or plastics which sandwich the honeycomb core C therebetween to be bonded together with thermosetting adhesive such as epoxy resin or the like. The thermosetting adhesive may be used in a paste-like state to be applied to both surfaces of the honeycomb core C or may be used in a half-solidified sheet-like state to be interposed between the honeycomb core C and the thin plates B.

When placing such a work W in the work accommodating chamber 13, the drawout tray 10 is withdrawn from the heating chamber 3. Then, to harden the thermosetting adhesive on the work W, the tray 10 is inserted into the heating chamber 3 and the work accommodating chamber 13 containing the work W is evacuated to form a vacuum. As shown in FIGS. 4 and 5, when the work accommodating chamber 13 is evacuated, the flexible sheet 16 acts to apply a pressing force by atmospheric pressure to the work W to clamp the thin plates B and the honeycomb core C tightly together. In this condition the work W is heated to harden the thermosetting adhesive, thus forming a honeycomb panel with the thin plates B and the honeycomb core C securely bonded together.

As mentioned above, the apparatus for honeycomb panels according to this invention allows the drawout trays to be individually operated to be inserted into or withdrawn from the heating chamber. Further at the inserting and withdrawing operation of the drawout tray, the block plates provided at the front and rear ends of the tray virtually isolates the heating chamber from the external air, so that a heating operation of the heating chamber need not be stopped during the inserting and withdrawing operation of the tray. That is say, while the heating operation continues without stopping the heater and the circulation fan, it is possible to withdraw the drawout tray out of the heating chamber, replace the heat-hardened work in it with an unprocessed work, and insert it again into the heating chamber. In this way, the apparatus of this invention permits a continuous processing of honeycomb panels while keeping the heating equipment in operation, thereby enhancing productivity. Also, the apparatus of this invention allows not to use an expensive autoclave.

What is claimed is:

1. Apparatus for producing honeycomb panels comprising:
    a heating chamber isolated from external air by a wall; and
    a plurality of drawout trays capable of being individually inserted into and withdrawn from the heating chamber through a plurality of openings formed in the wall; whereby each of the drawout trays has a work accommodating chamber connected to a vacuum source, a top opening of the work accommodating chamber being hermetically closed by a flexible sheet that can be opened and closed, and block plates at the front and rear ends for closing the opening in the wall at every terminal positions when inserted and withdrawn.

2. Apparatus for producing honeycomb panels as set forth in claim 1, wherein the plurality of drawout trays are arranged in multiple rows and tiers with gaps therebetween.

3. Apparatus for producing honeycomb panels as set forth in claim 1, wherein a large number of exhaust holes are formed in an inner wall of the work accommodating chamber of each drawout tray and communicate with an exhaust passage which is connected to the vacuum source.

4. Apparatus for producing honeycomb panels as set forth in claim 1, wherein each of the drawout trays can be inserted into and drawn out of the heating chamber through rollers and guide rails engaging with the rollers.

5. Apparatus for producing honeycomb panels as set forth in claim 1, wherein the flexible sheet on each of the drawout trays is formed of heat resistant silicone rubber.

6. Apparatus for producing honeycomb panels as set forth in claim 1, wherein the heating chamber is connected with a circulation passage in which a heater for heating air and a fan for circulating the hot air are installed.

7. Apparatus for producing honeycomb panels as set forth in claim 1, wherein a work placed in the work accommodating chamber of each of the drawout tray consists of a honeycomb core sandwitched between two thin plates bonded together with thermosetting adhesive.

* * * * *